UNITED STATES PATENT OFFICE.

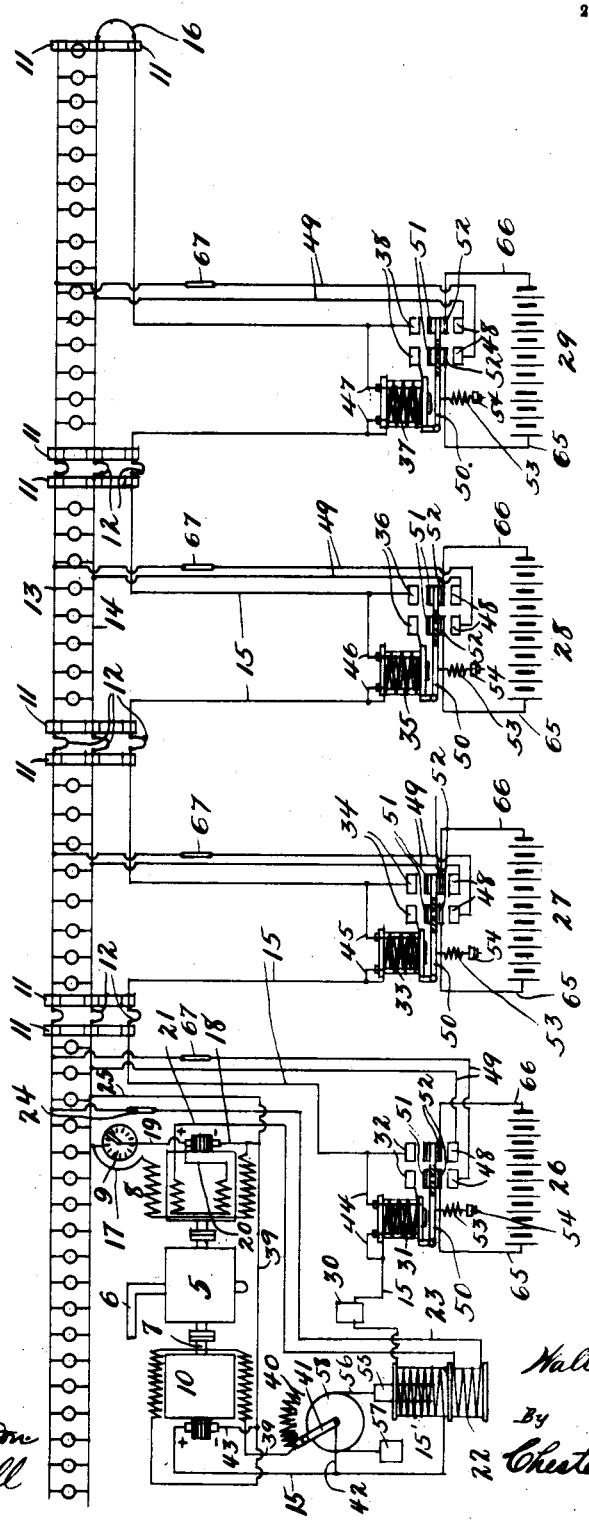

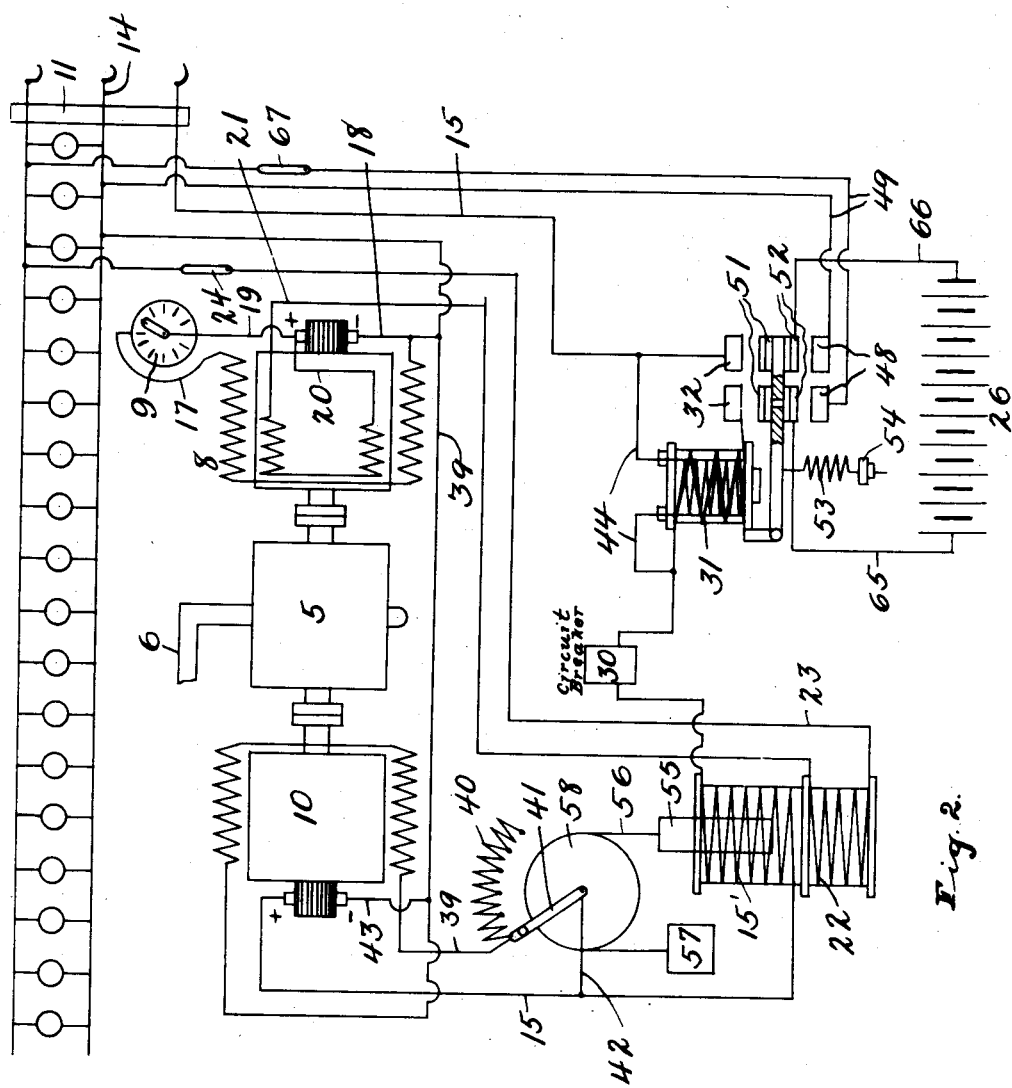

WALTER SCRIBNER, OF COLUMBUS, OHIO.

ELECTRIC TRAIN-LIGHTING SYSTEM.

No. 871,826.　　　Specification of Letters Patent.　　　Patented Nov. 26, 1907.

Application filed January 12, 1907. Serial No. 351,924.

*To all whom it may concern:*

Be it known that I, WALTER SCRIBNER, citizen of the United States, residing at Columbus, in the county of Franklin and State of Ohio, have invented certain new and useful Improvements in Electric Train-Lighting Systems, of which the following is a specification.

My invention relates to an electric train lighting system and has for its object the provision of means for lighting a train from a dynamo carried upon said train and also the provision of means for lighting the lamps upon any of the cars independently of the dynamo if any of said cars should be disconnected from the train or if the dynamo should be stopped for any reason.

A further object of the invention is the provision of means for charging storage batteries from the dynamo while the dynamo is being used for supplying a constant voltage to the lamps.

A further object of the invention is the provision of a plurality of sets of storage batteries carried by the separate cars of a train, together with means for charging said batteries in series and for discharging said batteries in parallel on to the lamp circuits when the dynamo normally used for lighting the lamps, is not running.

A further object of the invention is the provision of means for supplying an electric current of constant potential to lamps, fans or other apparatus requiring constant voltage and at the same time to supply a current of electricity of higher potential than that required for the lamps, fans and other apparatus, for the purpose of charging the batteries and to accomplish this result without the insertion of resistance, buckers etc., to reduce the voltage on the lamp circuits, the insertion of these elements resulting in a constant loss of power.

A further object of the invention is to provide a train lighting system that will be flexible as regards the consumption of prime motive power, that is, a system wherein the engine will be of such maximum capacity as is required to supply electricity to all lamps, fans or other electrical apparatus on the train requiring a current of constant potential and a minimum supply of current for charging the storage batteries, together with means whereby the electrical energy generated will fluctuate automatically from the lamps to the batteries or vice-versa as the case may be; as, for instance, when all of the lamps, fans, etc., are turned on requiring their full power, the battery charging current will be at a minimum point and as the lamps, fans etc., are turned off, the current previously consumed by them will be given to the batteries as an increased charging current, thereby maintaining a constant consumptive load on the engine, by virtue whereof the power required would not exceed at any time the maximum capacity of said engine. It is not necessary to install an engine of sufficient capacity to supply electricity for all of the electrical apparatus and at the same time supply electricity to charge the batteries at their maximum charging rate, for all of the lamps are not as a rule burning at the same time and by providing means for directing the current previously used by any lamp that is cut out, on to the charging line of the batteries, sufficient current will thus be directed to these batteries to keep them charged to their maximum potential. It is customary in systems of this character to provide an engine and dynamo to be carried in the baggage car. Since the saving of space is an important consideration under these circumstances, it is desirable to provide a train lighting system which will operate satisfactorily with a prime motor of minimum capacity.

A further object of the invention is the provision of automatic mechanism for disconnecting the batteries from the lamp circuits when they are being charged and for automatically connecting said batteries to the lamp circuits when the dynamo stops, said automatic mechanism being arranged to connect all of the cells of the batteries in series with the dynamo when said dynamo is running and being adapted to connect each set of batteries with the lamp circuit, in parallel, when the dynamo is not running. This charging of the batteries in series being particularly desirable, for when a plurality of sets of batteries are charged in parallel, the set or sets having the lowest voltage, consume the greatest amount of current and may require longer continued charging to bring them up to equal voltage with the other sets and if some of the batteries are in bad condition, it may prevent the other sets from becoming fully charged in a given length of time. When, however, the batteries are charged in series, the particular condition of any cell does not affect the charging of the remaining cells, but all cells will receive the same current strength charge, thereby bringing all perfect cells up to full charge and at the same time all defective cells up with them according to their respective condition.

Further objects and advantages of the invention will be set forth in the detailed description which now follows:

Figure 1 is a diagrammatic view illustrating a train lighting system constructed and arranged in accordance with the invention, and, Fig. 2 is a diagrammatic view illustrating the parts that are located in the baggage car of the train.

The drawing has been divided into four sections, each of said sections representing one of the cars of a train and the first of said sections representing the baggage car. Located in the baggage car is an engine 5, which may be a rotary engine and is adapted to receive steam from the boiler of a locomotive, not shown, through a pipe 6. The shaft 7 of the engine 5 is directly connected at one end to a compound wound constant potential dynamo 8, which will hereinafter be termed the lamp lighting dynamo. A shunt wound variable potential dynamo 10 is directly connected to the opposite end of the shaft 7. Train line receptacles 11 are adapted to receive plugs 12 which serve to connect the ends of and make a continuous line of main circuit wires 13, 14 and 15. A jumper plug 16 connects the end of the main circuit wire 15 with the main circuit wire 14 at the end of the last car. A conductor 17 leads from one of the posts of the rheostat 9 to the shunt winding of the compound wound dynamo 8 and through said shunt winding through a conductor 18 to the negative brush of said dynamo. A conductor 19 leads from the other post of said rheostat to the positive brush of said dynamo. A conductor 20 leads from the positive brush of the dynamo 8 through the other field winding of said dynamo to a conductor 21. This conductor is wound about a solenoid magnet 22 and is then continued as at 23 through a switch 24 to the main line wire 13. This circuit is completed through the lamp and the common return wire 14 and a conductor 25 to the conductor 18 and thence to the negative brush of the compound wound dynamo. Each of the cars carries a set of storage batteries 26, 27, 28 and 29. The main line wire 15 is connected to the positive brush of the battery charging dynamo 10 and passes thence around the solenoid magnet 22 as at 15', thence through a reverse current-circuit breaker 30 to and around a switch magnet 31, through the contact points 32 when said contacts are connected as hereinafter described, through one of the train line plugs between the baggage car and car No. 2, to, and around a second switch magnet 33; from said magnet 33 to and through the contact points 34 when said contacts are connected. The conductor 15 then passes through one of the train line plugs 12 between car No. 2 and car No. 3 to and around a switch magnet 35. The circuit is completed through contact points 36 when said contact points are connected, the conductor 15 being continued from one of said contact points to and through one of the train line plugs 12 between car No. 3 and car No. 4, thence to a switch magnet 37, the circuit being completed through terminals 38 when said terminals are connected. The jumper plug 16 serves to connect the end of the main line wire 15 to the common return wire 14 at the rear end of the train. A conductor 39 leads from the conductor 25 to a conductor 43 which is in turn connected to the negative brush of dynamo 10. An automatic current regulating rheostat is indicated at 40. The movable arm 41 of this rheostat is connected by a conductor 42 with the main line wire 15, thence through rheostat to and through shunt field winding of dynamo 10 to wire 43 onto negative brush of said dynamo. The switch magnets 31, 33, 35 and 37 are bridged across the contact points 32 by conductors 44, 45, 46 and 47. Contact points 48 are connected by conductors 49 with the main line wires 13 and 14, the lamps or other electrical apparatus such as fans being connected in parallel across these main line wires. Movable armatures 50 of the switch magnets carry contact members 51 and 52, the contact members 51 being adapted to establish communication between the contact points 32, 34, 36 and 38 and the contact point 52 being adapted to establish communication between the contact points 48. Springs 53 normally tend to draw the armature 50 down into such position as to establish communication between the contact points 48 and the tension of these springs may be adjusted by thumb nuts 54 of the usual and well known construction. The core 55 of the solenoid magnet 22 is connected by a cable 56 with a weight 57, said weight passing over a pulley 58.

The operation of the device is as follows When the dynamos are not running, the armatures 50 are held in a downward position by the springs 53 at which time the terminal wires 65 and 66 of the batteries are connected through the contacts 48 with the conductors 49 and the batteries are consequently discharging in parallel on to the main line wires 13 and 14. Switches 67 provide means for cutting off the current to the lamps in any car when desired. After the train has been made up and the cars are coupled together, the train line connecting plugs 12 are plugged into the train line receptacles 11, thereby connecting the main line wires 13, 14 and 15 throughout the train. When it is desired to start the dynamos, the engine 5 is given steam and brought up to its maximum speed. The lamp lighting dynamo 8 is brought up to a voltage corresponding to that of the batteries and is then cut in on the main lamp circuit wires 13 and 14 by means of the switch 24. Since the conductors 21 and 23 are coiled about the solenoid magnet 22, it follows that said magnet will be energized in direct proportion to the strength of the current generated by dynamo 8, and the number of windings about said magnet. This dynamo being compound wound, maintains a constant potential voltage on the lamp circuit regardless of the number of lamps being used. After this dynamo has been cut in on the lamp circuit when first started, it is then working in parallel with the various sets of batteries. The battery charging dynamo 10 is then allowed to build up in voltage to a point corresponding to the voltage adjustment of all of the automatic battery charging switches added together, that is, if the battery sets require for charging a voltage of 50 to each set, the springs 53 are so adjusted that when the shunt windings of the automatic switch magnets 31, 33, 35 and 37 receive a current of fifty volts each, the magnets being in series will lift the armatures 50 to their upward position, thereby disconnecting the batteries from the lamp circuit and connecting them in series to the main line wire or battery charging wire 15.

As has been hereinbefore described, the shunt windings of the automatic switch magnets 31, 33, 35 and 37 are connected across the two upper contacts of said magnets by the conductors 44, 45, 46 and 47, hence when the armatures 50 are in their downward position, the battery charging line wire 15 is closed through these shunt windings, then as the battery charging dynamo 10 builds up in voltage, there is only sufficient current passing through wire 15 to energize these magnets. When the dynamo 10 builds up to the voltage adjustment of all of the springs 53, combined that is, fifty volts for each spring, the magnets 31, 33, 35 and 37 will be sufficiently energized to lift all of the armatures 50, at which time said magnets will be strengthened by the battery charging current passing around the series winding, thereby securing firmer contact between the upper contact points of the armatures and the contact points 32, 34, 36 and 38. When these armatures are lifted to their upper position, the batteries are being charged, the current passing from the positive side of the battery charging dynamo 10 to and around the solenoid magnet 22, thence through the reverse current circuit breaker 30 to and around the series windings of the switch magnets, thence through the left hand contact point 32 of the baggage car to the left hand contact points 51 and 52, thence to and through the batteries 26, then through the conductor 66 to the right hand movable contact points 51 and 52, thence to the right hand contact point 32 to the wire 15. The circuit is completed through all of the battery sets in the same manner and returns to the negative side of the dynamo 10 through jumper plug 16, line 14, conductors 25 and 39 and conductor 43.

The battery charging current from the dynamo 10 is automatically controlled by the solenoid magnet 22, said solenoid magnet and the parts connected thereto forming an automatic charging current regulator. When there is no current passing around the solenoid magnet windings, the weight 57 holds the rheostat arm 41 back to the position illustrated in the drawing, thereby cutting out all of the resistance of the rheostat 40 in the field of the dynamo 10. This arm 41 maintains this position until said dynamo builds up to a voltage sufficient to lift the automatic switch armatures to their upper position, at which time the batteries are cut in on the charging line wire 15. A charging current passing around the coil of the solenoid magnet now energizes this magnet and pulls the core 55 thereof down to the point where the weight 57 balances the pull of said magnet. As the core 55 is pulled down, the rheostat arm is moved forward by virtue of the rotation imparted to the disk 58 by the cable 56 as will be readily understood. This movement of the arm continues until it reaches a point on the field rheostat when there will be just enough current pass around the field of the dynamo 10 to cause said dynamo to generate a current which corresponds to the ampere load adjustment of the weight 57. It is apparent that any desired weight may be applied at this point. The current thus generated will just balance the weight 57 when there are no lamps burning and when no current is being supplied to the lamp circuit by the lamp lighting dynamo 8.

As an illustration of the operation of this system, it will be assumed that it is desired to charge the batteries at 40 amperes. With no load on the lamp lighting dynamo, the weight 57 is so adjusted that forty amperes passing around the coil 15' of the solenoid magnet will pull the rheostat arm to a point where there will be just enough current pass around the fields of the dynamo 10 to cause said dynamo to generate a current of forty amperes only, at which point it will stay until lamps, fans or other electrical apparatus are turned on on the lamp circuit. As has been hereinbefore set forth, the positive wire of the lamp lighting dynamo 8 passes around the solenoid magnet. The increased current flow around this magnet when these additional lamps are turned on, increases the strength of said magnet and draws the core 55 farther down in direct proportion to the amount of current being used on the lamp circuit. This moves the rheostat arm 41 further to the right and cuts in more resistance in the field of the battery charging dynamo 10. This reduces the amount of current generated by this dynamo in like proportion to the increased current delivered to the lamp circuit by the lamp lighting dynamo. It will therefore be seen that if the engine has a maximum capacity equal to the full load of the lamp lighting dynamo 8 and a minimum of say, five amperes on the battery charging dynamo 10 and if the lamp lighting dynamo 8 has reached its full load, the full load amperes of dynamo 8 will pass around the solenoid magnet, the two windings of which are so proportioned that when the full ampere load of dynamo 8 is passing around said magnet, it will strengthen the magnet to such a degree that it will pull the rheostat arm to a point where the battery charging current will be reduced to a minimum and vice versa, that is, as the load on the lamp lighting circuit is reduced, the solenoid magnet is weakened allowing the weight 57 to pull the rheostat arm back toward the left in direct proportion to the reduction in watts on the lamp circuit thereby increasing the battery charging current in like proportion. This reverse action continues until when there is no current being consumed on the lamp circuit, the battery charging current reaches the maximum point at which the regulator is set, at which point it will stay until the dynamos are shut down, or the lamps are again turned on.

From the foregoing description, it will be seen that by virtue of the construction herein shown and described, I am enabled to light a train of cars en route by electricity generated from dynamos and storage batteries to drive the dynamos by a steam engine, to supply the lamps, fans and other apparatus with a constant potential current and at the same time supply a current of higher potential than that required for the lamps and other apparatus, for the purpose of charging the storage batteries. I am also enabled to charge the storage batteries in series independently of the lamp circuit and to discharge the batteries in parallel on to said lamp circuit when desired. Means have also been provided for automatically switching the batteries from series charging to parallel discharging and vice versa, and to automatically shift the load from one dynamo to the other as the required current in the lamp circuit varies, thereby keeping within the maximum horse power capacity of the engine. This system also provides means whereby two voltages may be had on three main train line wires, without the use of a resistance of some kind being inserted in the lamp circuit, it being readily understood that the use of a resistance element in said circuit, results in a constant loss of power.

This system is an economical one and one that will require little, if any, attention after being started.

While the elements shown and described are well adapted to serve the purposes for which they are intended, it is to be understood that the invention is not limited to the precise construction set forth, but includes within its purview such changes as may be made within the scope of the appended claims.

What I claim, is:

1. In a train lighting system, the combination with a plurality of cars, of a set of storage batteries carried upon each of said cars; a main lamp circuit which extends through the cars, a battery charging dynamo, and automatic switches adapted to connect the storage batteries of each car in parallel on to the main lamp circuit of said cars and also adapted to automatically and simultaneously connect the said battery charging dynamo in series with the storage batteries and disconnect said batteries from the lamp circuit.

2. In a train lighting system, the combination with a main lamp circuit, of a compound wound lamp lighting dynamo, a shunt wound battery charging dynamo, a plurality of sets of storage batteries, a plurality of automatic switches adapted to connect said storage batteries in series with the battery charging dynamo or to connect said batteries in parallel on to the lamp circuit.

3. In a train lighting system, the combination with a main lamp circuit, of a compound wound lamp lighting dynamo, a shunt wound battery charging dynamo, a plurality of sets of storage batteries, a plurality of automatic switches adapted to connect said storage batteries in series with the battery charging dynamo or to connect said batteries in parallel on to the lamp circuit, and an automatic current controlling device located in the field circuit of the battery charging dynamo and adapted to be actuated by variations of current in the lamp circuit.

4. In a train lighting system, the combination with a main lamp circuit, of a compound wound lamp lighting dynamo, a shunt wound battery charging dynamo, means for driving said dynamos, a plurality of sets of storage batteries, automatic switches comprising movable contact points, mechanical means for holding said contact points in such position as to connect each of said sets of batteries in parallel to the lamp circuit, and electrical means adapted to automatically connect all of said sets of storage batteries in series with the battery charging dynamo.

5. In a train lighting system, the combination with a plurality of cars, of a main lamp circuit which extends through all of said cars, of a plurality of sets of storage batteries, a battery charging circuit which extends through all of said cars, a constant potential lamp lighting dynamo, a variable potential battery charging dynamo, and an automatic current regulator which controls the strength of the field of the battery charging dynamo, said current regulator being provided with a plurality of windings, one of said windings being in circuit with the constant potential dynamo and the other of said windings being in circuit with the variable potential dynamo whereby said current regulator will be controlled both by variations of current in the lamp circuit and by variations of current in the battery charging circuit.

In testimony whereof I affix my signature in presence of two witnesses.

WALTER SCRIBNER.

Witnesses:
FRANK G. CAMPBELL,
A. L. PHELPS.